United States Patent
Zhang et al.

(10) Patent No.: US 11,463,851 B2
(45) Date of Patent: Oct. 4, 2022

(54) V2X COMMUNICATION SYSTEM WITH AUTONOMOUS DRIVING INFORMATION

(71) Applicant: Harman International Industries, Incorporated, Stamford, CT (US)

(72) Inventors: Guoxia Zhang, Shanghai (CN); Qingshan Zhang, Shanghai (CN)

(73) Assignee: Harman International Industries, Incorporated, Stamford, CT (US)

( * ) Notice: Subject to any disclaimer, the term of this patent is extended or adjusted under 35 U.S.C. 154(b) by 54 days.

(21) Appl. No.: 17/150,477

(22) Filed: Jan. 15, 2021

(65) Prior Publication Data

US 2022/0232357 A1  Jul. 21, 2022

(51) Int. Cl.
*H04W 4/40* (2018.01)

(52) U.S. Cl.
CPC .................... *H04W 4/40* (2018.02)

(58) Field of Classification Search
CPC .............................................. H04W 4/40–48
See application file for complete search history.

(56) References Cited

U.S. PATENT DOCUMENTS

| | | | |
|---|---|---|---|
| 10,098,014 B1 | 10/2018 | Shimizu | |
| 11,073,390 B2 * | 7/2021 | Lee | G01S 7/4811 |
| 2020/0342760 A1 | 10/2020 | Vassilovski | |
| 2021/0370932 A1 * | 12/2021 | Yan | G06K 9/6297 |
| 2022/0044567 A1 * | 2/2022 | Liollio | G08G 1/096725 |

FOREIGN PATENT DOCUMENTS

| | | | | |
|---|---|---|---|---|
| CN | 108349497 A | * | 7/2018 | ...... B60W 30/18027 |
| CN | 110427827 A | * | 11/2019 | |
| CN | 113753059 A | * | 12/2021 | |
| EP | 3588990 A1 | | 1/2020 | |
| JP | 3586062 B2 | * | 11/2004 | |
| JP | 3758443 B2 | * | 3/2006 | |

* cited by examiner

*Primary Examiner* — Thomas R Cairns
(74) *Attorney, Agent, or Firm* — Angela M. Brunetti

(57) ABSTRACT

An in-vehicle computing system and method that extracts driving intention data, driving capability data, and a driving mode data from one or more vehicle systems including an autonomous driving system. Autonomous driving information is derived from the extracted data. A message frame is created to include the autonomous driving information and sent to a V2X system.

18 Claims, 4 Drawing Sheets

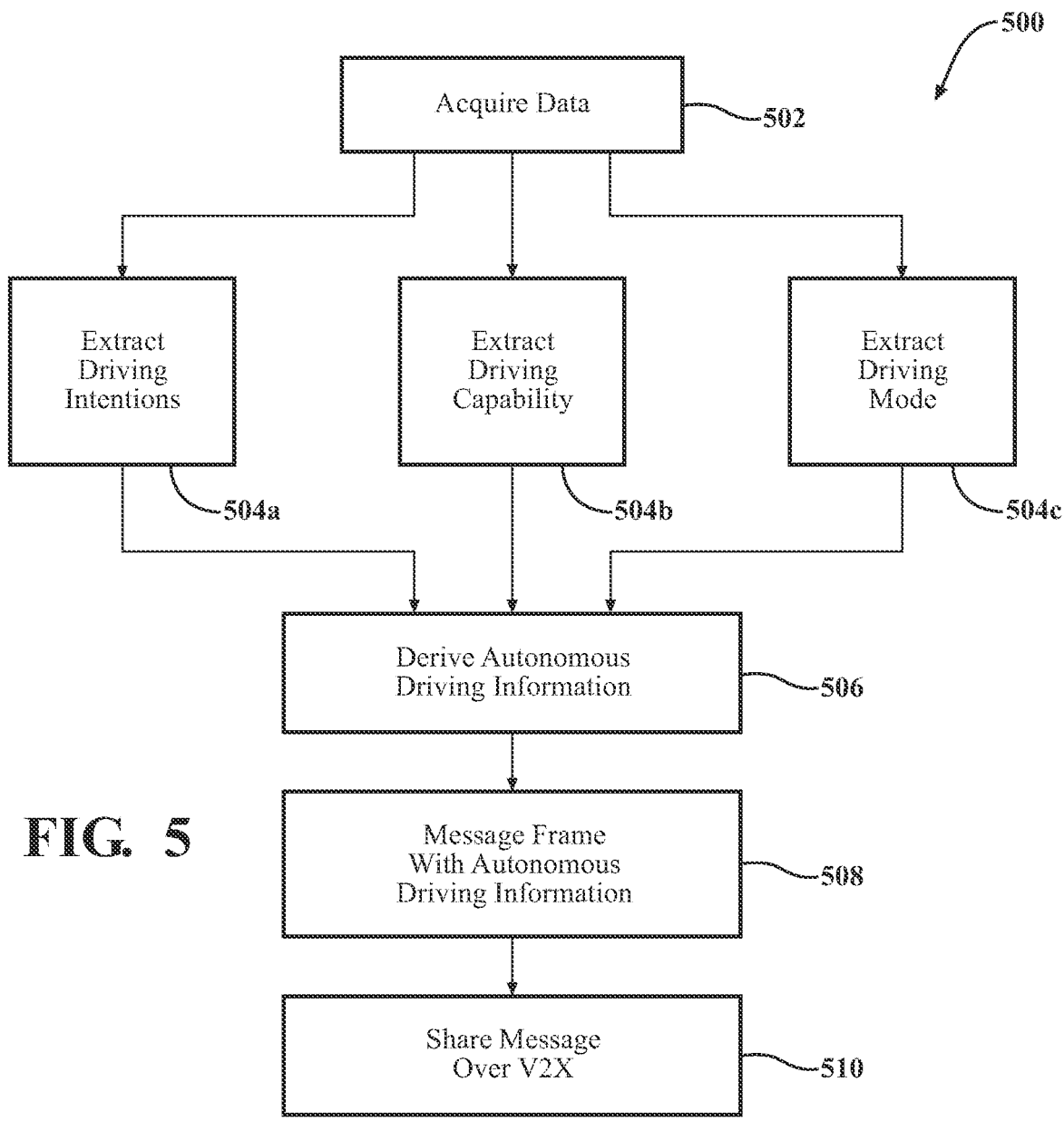

V2X COMMUNICATION SYSTEM WITH AUTONOMOUS DRIVING INFORMATION

TECHNICAL FIELD

The present disclosure is directed to a vehicle-to-everything (V2X) communication system and more particularly to a message with autonomous driving information in the V2X communication system.

BACKGROUND

Vehicle-to-everything (V2X) is a technology that allows vehicles to communicate with moving parts of a surrounding traffic system them that is used in driver assistance and autonomous driving systems. V2X has several components including vehicle-to-vehicle (V2V), vehicle-to-infrastructure (V2I), vehicle-to-pedestrian (V2P), and vehicle-to-network (V2N). The V2X system has a unique non line-of sight sensing capability that uses dynamic information among neighboring vehicles, infrastructure, and pedestrians to detect potential hazards, traffic, and road conditions from longer distances and sooner than in-vehicle sensors. This dynamic information may be exchanged with neighboring vehicles for Advanced Driving Support Systems (ADAS), and more particularly to Autonomous Driving (AD) functions, to make accurate driving policy decisions.

V2X communication systems operate using messaging standards that are defined by SAE 2735 and by ETSI. However, current V2X communication systems are designed to provide driver assistance, which corresponds to Level 0 (of six levels, 0-5) in the definition of automation levels in SAE J3016. Higher levels of autonomous vehicles have more powerful capabilities meaning levels of automation above Level 1 introduce new requirements that are not covered by current V2X systems. There is a need to enhance the information exchanged among vehicles.

SUMMARY

Embodiments are disclosed for a V2X communication system with autonomous driving information. An example vehicle system includes one or more systems for sending and receiving position and sensor data. An in-vehicle communication system is configured to send and receive position data about the vehicle and surrounding vehicles and other sensor data in the V2X system. An in-vehicle computing system has an intention data extraction module that extracts driving intention data, a driving capability extraction module that extracts driving capability data, and a driving mode extraction data module that extracts driving mode data from the systems including the autonomous driving system. Autonomous driving information is derived from the extracted data. A message frame is created that includes the autonomous driving information. The message frame is sent to the V2X system.

The autonomous driving information includes route data, driving behavior and motion. Route data may include a sequence of waypoints. Driving behavior data may include a driving task and driving motion data may include a vehicle trajectory. Driving capability data includes an autonomous driving level. The message frame may be an extension of a Basic Safety Message (BSM) that may be sent upon request by a nearby vehicle in the V2X system.

Embodiments are disclosed for a method for communicating autonomous driving information in a V2X system. The method includes extracting driving intention data, driving capability data, and driving mode data from an autonomous driving system. Autonomous driving information is derived from the extracted data and a message frame is created that includes the autonomous driving information. The message frame is sent to the V2X system as a standalone message or as an extension to a Basic Safety Message. The message frame may be sent periodically or upon request by a nearby vehicle in the V2X system.

DESCRIPTION OF DRAWINGS

FIG. 4 is a representation of Basic Message Frame with autonomous driving information; and FIG. 5 is a flowchart of a method for developing the Basic Message Frame with autonomous driving information.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

While various aspects of the present disclosure are described with reference to a particular illustrative embodiment, the present disclosure is not limited to such embodiments, and additional modifications, applications, and embodiments may be implemented without departing from the present disclosure. In the figures, like reference numbers will be used to illustrate the same components.

Figure 1:
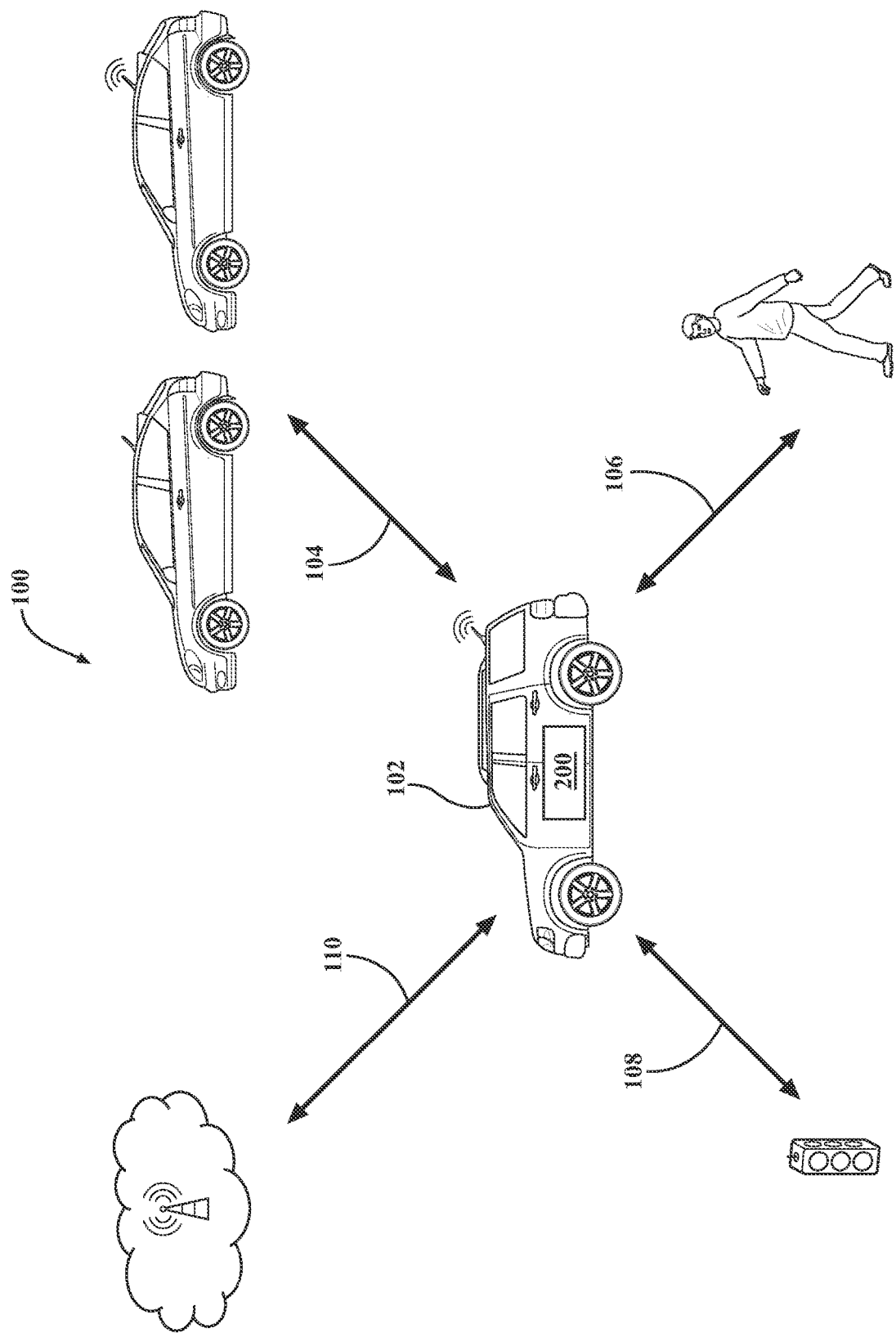
FIG. 1 is a block diagram of a V2X communication system and a vehicle in communication with elements of the V2X system.

FIG. 1 is a block diagram of a vehicle-to-everything (V2X) system 100 wherein vehicle 102 has a vehicle computing system 200 that has the capability to communicate vehicle-to-vehicle (V2V) 104, vehicle-to-pedestrian (V2P) 106, vehicle-to-infrastructure (V2I) 108 and vehicle-to-network (V2N) 110. V2V 104 wirelessly exchanges information about speed, location and heading between vehicles to create awareness of nearby vehicles within the V2X system. V2P 106 focuses on communication between vehicles and pedestrians which may take place, for example, using sensors on the vehicle or handheld devices on the pedestrian. V2I 108 exchanges information about traffic between vehicles and infrastructure, which may include, but is not limited to, RFID readers in signage, cameras, traffic lights, lane markers, tolls, etc., and may provide vehicles with information related to road conditions, traffic, construction zones, speed limits, etc. V2N 110 allows vehicles to receive alerts over a network. V2N also allows vehicles to communicate with each other.

Figure 2:
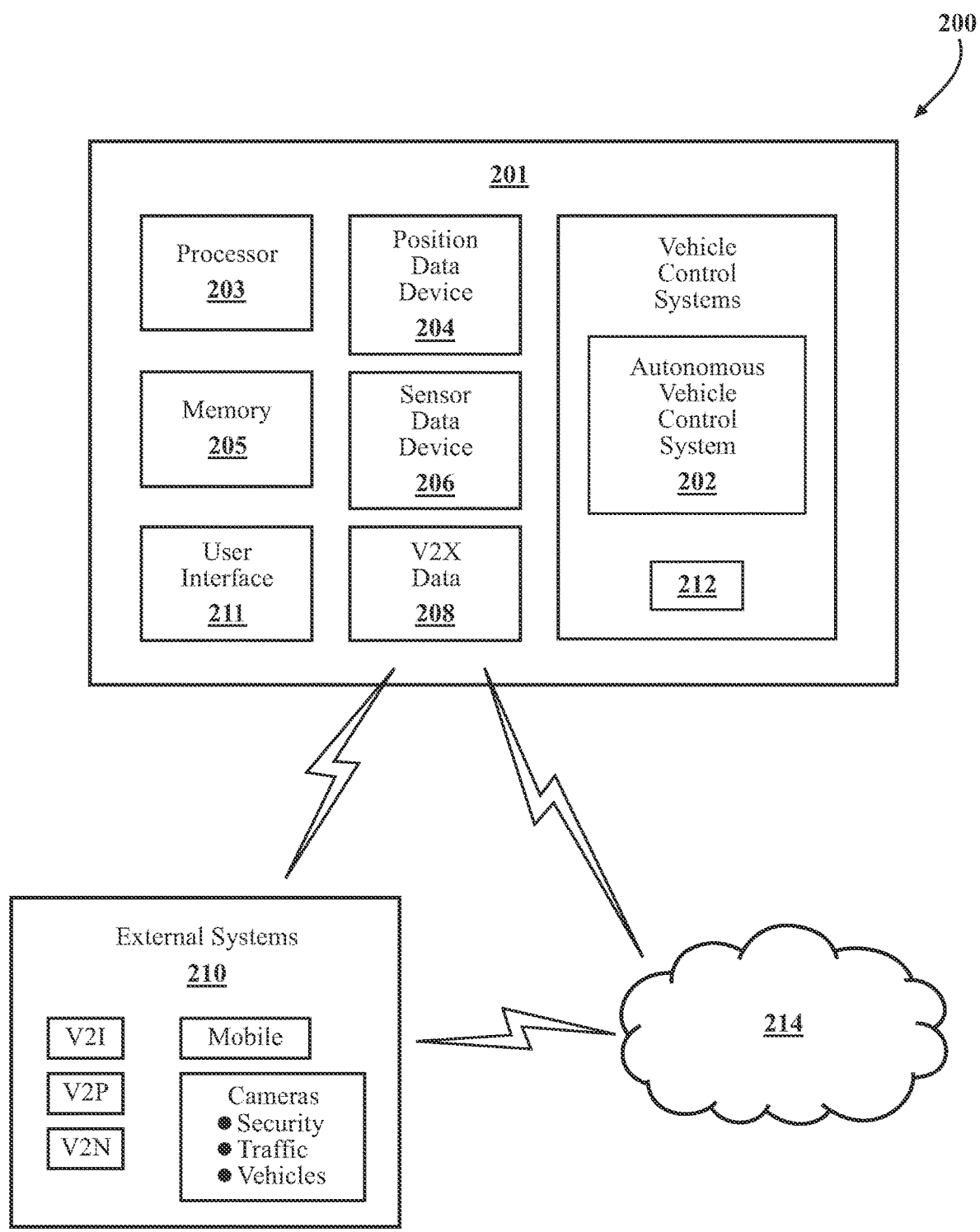
FIG. 2 is a block diagram of an in-vehicle communication system coupled to the V2X communication system.

The vehicle computing system 200 is shown and described with reference to FIG. 2. The system 200 has an in-vehicle computing system 201 that is operable to perform one or more of the methods described herein. The in-vehicle computing system 201 has a processor 203 to communicate with one or more vehicle control systems including an autonomous vehicle control system 202. The processor 203 is also operable to execute instructions stored in a storage device, such as non-volatile memory 205 to control one or more systems of the vehicle including the autonomous driving system 202. The system 200 is capable of sending and receiving data to and from other vehicle systems, sub-systems, hardware components, and software components including the autonomous driving system 202, a position data device 204, and a sensor data device 206.

The position data device 204 acquires position data from the vehicle. Position data may, for example, be acquired from a navigation system, GPS, or sensors on the vehicle. Position data may be position and navigation data such as current location, relative position, destination, routing information, etc. The sensor data device 206 may include vehicle sensors and ADAS sensors such as accelerometers, cameras, wheel speed sensors, steering angle sensors, yaw rate sensors, LiDAR, Radar, engine parameters, battery parameters, ambient conditions, climate sensors, etc. that are on the vehicle. The sensor data device 206 sends data from the vehicle to surrounding vehicles. For example, the sensor data may include identification, position, velocity (speed and heading), size (length and width), shape for an object identified by the vehicle.

The V2X data device, or V2X sender, 208 may send data from the vehicle and may receive data from vehicles in a same communication network as the position data device 204. The V2X data device 208 may receive data from systems internal to the vehicle such as the autonomous driving system, and external systems 210 such as V2I, V2P, V2N. External systems 210 may include cameras in other vehicles, traffic cameras, security cameras, and mobile devices to name a few. Other examples of data being received by the V2X data device 208 may include navigation services, traffic data, traffic signal information, etc. being broadcast over a network. The sensor data device 206 may also receive data from surrounding vehicles in the V2X system. The sensor data may include identification, position, velocity (speed and heading), size (length and width), shape for an object identified by a surrounding vehicle.

The basic driving information acquired by the position data device 204, the sensor data device 206 and the V2X data device 208 may include speed data and heading data. This data may be broadcast from the vehicle itself and it may also broadcast position data of another vehicle that is communicating with the vehicle, such as position data from a surrounding vehicle. The broadcast occurs as a message, capable of being received and transmitted, as a Basic Safety Message (BSM) or a Cooperative Awareness Message (CAM). The BSM or CAM may be communicated between components in the V2X system and to a cloud network 214 for autonomous vehicles where data is stored and processed to support autonomous driving platforms.

The in-vehicle computing system 201 has a storage device, such as memory 205 to store instructions executable by the processor 203. Computing system 201 receives signals from vehicle systems 204, 206, 208, 210, and a user interface 211. The user interface 211 may be a display, touch screen, or another device operable by the user to input user selections. The inputs are analyzed and the processor 203 executes instructions for various vehicle systems 212 that control actuators. The vehicle actuators perform, among other functions, ADAS and AD functions to assist in avoiding impending collision. In autonomous driving operations, ADAS may also be utilized, in cooperation with V2V, V2I, V2P and V2N, to extend knowledge about a driving environment to include information related to traffic conditions, road conditions, surrounding vehicles/objects positions. This information may be broadcast from one or more vehicles to other vehicles in the driving environment, for example, in the Basic Safety Message (BSM) using wireless communication such as a dedicated short-range communication (DSRC) network, Bluetooth, Wi-Fi, nearfield communication, etc. The information shared will depend upon a level at which the autonomous vehicle is operating.

According to the inventive subject matter, the BSM may be enhanced with a message frame that includes autonomous driving information. The autonomous driving information may be represented as an additional message or as an extension field included in the BSM. In either event, the basic dynamic information regarding position, speed and heading that is exchanged in the V2X system is supplemented with driving intention data, driving capability data, and driving mode data. Extending messages that are defined by SAE 2735 to include driving intention data, driving capability data, and driving mode data, allows neighboring vehicles to make more accurate driving policy decisions.

Figure 3:
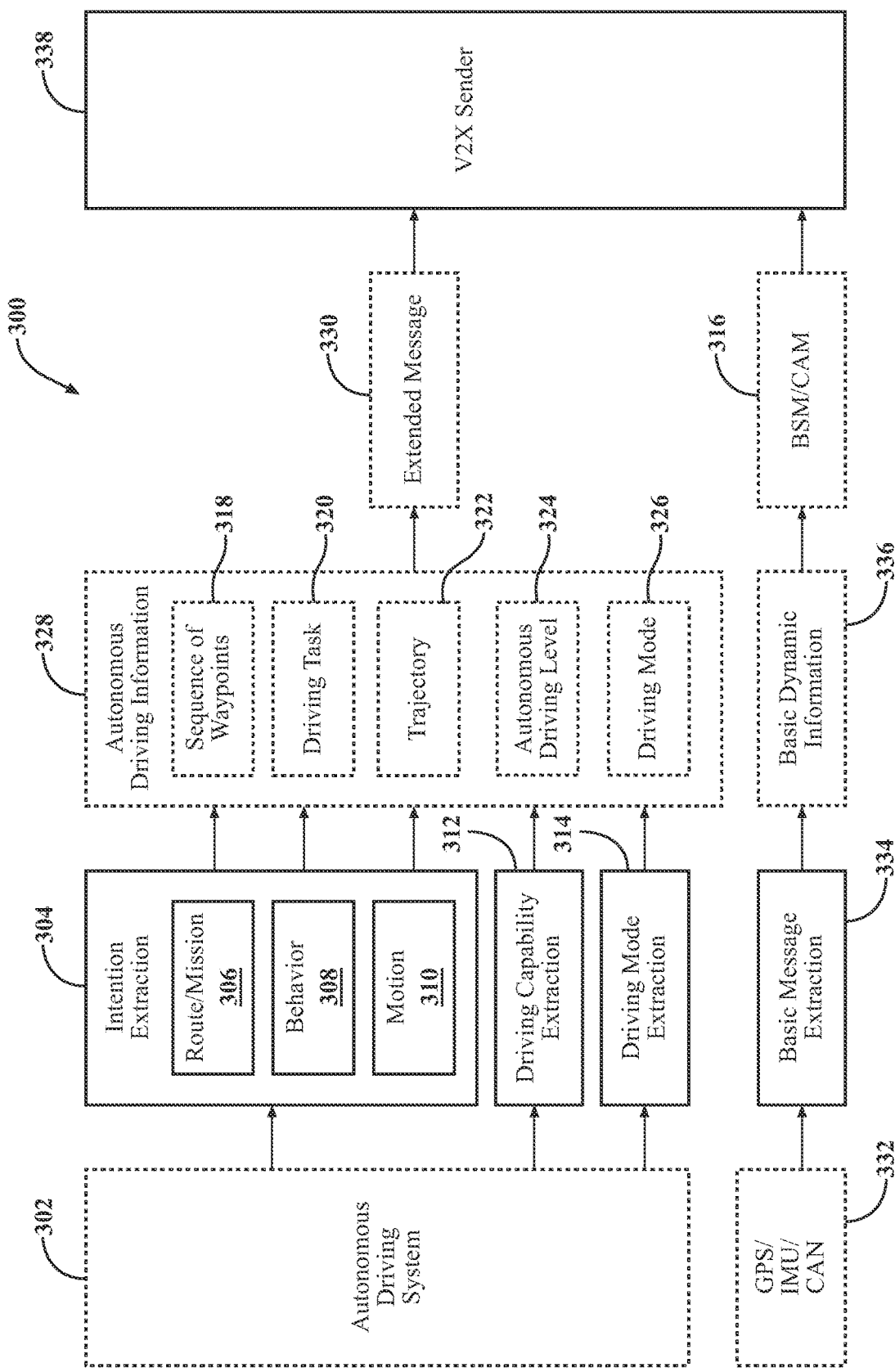
FIG. 3 is a block diagram of the extraction of autonomous driving information from the in-vehicle communication system.

FIG. 3 is a block diagram of a system 300 for creating a message frame 330 that includes autonomous driving information 328 extracted from an autonomous vehicle control system 302, also referred to as an autonomous vehicle control system, by way of various extraction modules. The autonomous vehicle control system 302 is mined for autonomous driving information by the extraction modules to create message frame 330 that is ultimately shared to the V2X system. The message frame 330 may be a new standalone message or it may be an extension field of a BSM 316. In either scenario, the autonomous driving information 328 is sent by a V2X sender 338 to systems of the V2X system external to the vehicle.

An autonomous driving information 328 is derived from data extracted from the autonomous vehicle control system 302. An intention extraction module 304 extracts driving intention data from the autonomous vehicle control system 302. A driving capability extraction module 312 extracts driving capability data from the autonomous vehicle control system 302. And a driving mode extraction module 314 extracts driving mode data from the autonomous vehicle control system 302. Driving intention data refers to route data for a route that is planned to be driven and a maneuver that the vehicle is about to perform. For an autonomous vehicle, driving intention data may be broken down into three separate components: route/mission intention data 306, behavior intention data 308, and motion intention data 310.

Route, or mission, intention data 306 is the navigation and planning of a route to a destination through a road network. The road network may be viewed as a connected graph and selecting an optimal route is equivalent to finding, for example, the lowest-cost-path under certain restrictions of traffic rules. The route, or mission, intention data is a sequence of waypoints through the road between points A and B. All levels (Levels 0-5) of autonomous vehicles may share route, or mission, intention 306 information.

Behavior intention data 308 is data representative of a decision about a local driving task which is generated by interacting with surrounding traffic and environment in accordance with the rules of the road. A selected behavior must be safe, yet efficient, driving behavior taking into consideration all other traffic participants in the vicinity of the vehicle. For example, when the vehicle decides to exit a highway, it will need to navigate from its current lane of travel to the exit lane without interfering with all other vehicles on the road. Level 2 or above autonomous vehicles may share behavior intention data 308.

Motion intention data 310 follows a given strategy and derives a continuous vehicle trajectory that will be executed by the autonomous driving system 302. The continuous vehicle trajectory must be physically feasible for the vehicle, it must be safe for the vehicle, and it must be comfortable for any passengers in the vehicle. The vehicle trajectory avoids any possible collisions with obstacles or other traffic participants. This vehicle trajectory consists of a sequence of states that the vehicle must follow, and each state consists of a position and velocity at a certain time.

Driving capability data extracted from driving capability extraction module 312 refers to the vehicle's level of driving automation. J3016 is a standard that defines six level of driving automation as Level 0 to Level 5. The levels generally relate to what extent a human driver is involved in controlling the vehicle. SAE Level Zero is the lowest with no automation and the driver is driving by constantly supervising steering, braking, and acceleration as needed to maintain a safe level of driving. SAE Level 5 is the highest with full vehicle autonomy. At level 1, a driver is assisted with some functions, but the driver still handles accelerating, braking, and monitoring the vehicle environment. At Level 2 the vehicle assists the driver with steering or acceleration functions allowing the driver to disengage. However, the driver must be ready to take control of the vehicle and is responsible for safety functions and monitoring the environment. At Level 3 the vehicle also monitors the environment and allows the driver to disengage even further from safety functions.

Level 4 is highly automated. The vehicle is capable of steering, braking, accelerating, monitoring the vehicle and roadway as well as responding to events in the environment, determining when to change lanes and using turn signals. At Level 4 the autonomous driving system determines when conditions are safe and alerts the driver to the ability to switch to auto-mode. Only then can a driver switch the vehicle to auto-mode. Level 5 is fully automated. At Level 5 the driver is not driving. The automated features do not require the driver to take over driving at any time.

Driving mode data, extracted from the driving mode extraction module 314, refers to the driving mode and corresponds to the level of human driver interaction with the vehicle. There are three driving modes, auto-mode, hands-off mode, and driver mode. For levels of automation below Level 4 there are one or more operating domains within which an automated function or system is designed to operate. Examples of domains include, but are not limited to, roadway types, speed range, environmental conditions such as weather, daytime, nighttime, etc.

Auto-mode is when the autonomous driving system 302 has the capability to perform a complete dynamic driving task within a defined operating domain. Hands-off mode is when the autonomous driving system 302 transfers control to a human driver. This may occur when the autonomous driving system 302 determines it would need to operate beyond the specific operating domains. In hands-off mode, the autonomous driving system 302 hands over control to the human driver. Hands-off mode may last for several seconds while the human driver takes back control. Driver mode is when the driver is in control of driving the vehicle.

Autonomous driving information 328 to be included in the message frame 330 is derived from the driving intention data extracted from the intention data extraction module 304, driving capability data extracted from the driving capability extraction module 312, and driving mode data extracted from the driving mode extraction module 314. Driving intention data and driving mode data are extracted from the autonomous driving system 302 in real time. Driving capability may also be extracted from the autonomous driving system 302. Alternatively, driving capability data may be extracted from the user interface 211 (not shown in FIG. 3).

The autonomous driving information 328 includes, but is not limited to, a sequence of waypoints 318, a driving task 320, a vehicle trajectory 322, an autonomous driving level 324 and a driving mode 326. The autonomous driving information 328 is represented as a message frame 330 that may be represented as a new message or it may be an extension field that is included in the BSM 316.

The BSM 316 includes data derived from standard position data 332 comprised of GPS data, Inertial Measurement Unit (IMU) data, and Control Area Network (CAN). Basic message extraction 334 includes basic dynamic information 336 such as position, speed and heading. The BSM 316, without supplemental data, may be transmitted to a V2X sender 338 such as the intra-vehicle communication device. As discussed above, the autonomous driving information message frame 330 may be represented as a new message or it may be an extension field that is included in the BSM 316 to be sent by the V2X sender 338.

FIG. 4 is a representation 400 of autonomous driving information as a basic message frame, stand alone or as an extension field included in the BSM. The autonomous driving information is organized into a VehicleAutoExtension data frame 402 in ASN.1 representation. With the autonomous driving information, sent as a message or an extended message, vehicle automated driving systems in a V2X system are made aware of the vehicle's surroundings thereby improving driving policy decisions that will be made by autonomous driving systems. This is particularly valuable for Level 5 automation. The message frame exemplified in FIG. 4 is in two parts. Part I 404 includes the basic safety message and Part II 406 includes the extended messages which includes the autonomous driving information 328. The autonomous driving information message frame 330 may be sent periodically or it may be sent upon request by other vehicles or systems in the V2X system.

FIG. 5 is a flowchart 500 of a method for deriving a message frame including autonomous driving information to be shared within a V2X system. In 502 data is acquired from multiple sources, and includes position data, sensor data and V2X data. In steps 504a, 504b, and 504c autonomous driving information is extracted. 504a is the extraction of driving intentions from the autonomous driving system by way of the driving intention extraction module. 504b is the extraction of driving capability data from the driving capability data extraction module. 504c is the extraction of driving mode from the driving mode extraction module or the user interface.

At step 506 autonomous driving information to be included in a message is derived from the extracted driving intention data, driving capability data, and driving mode data. The derived autonomous driving information includes a sequence of waypoints for the vehicle, a driving task for the vehicle, a trajectory for the vehicle, an autonomous driving level, and the driving mode. At step 508 a message frame is created that includes the derived autonomous driving information and is presented in a format that can be sent by the V2X sender.

At step 510, the message is shared within the V2X by way of the V2X sender. The message with autonomous driving information may be sent as its own message, or it may be included as an extension in the BSM. Furthermore, the message may be sent periodically or at the request of other vehicles or systems in the V2X.

In the foregoing specification, the present disclosure has been described with reference to specific exemplary embodiments. Various modifications and changes may be made, however, without departing from the scope of the present disclosure as set forth in the claims. For example, unless otherwise noted, the method described with reference to FIG. 5, may be performed by a suitable device and/or combination of devices, such as described with reference to FIGS. 2 and 3. The specification and figures are illustrative, rather than restrictive, and modifications are intended to be included within the scope of the present disclosure. Accordingly, the scope of the present disclosure should be determined by the claims and their legal equivalents rather than by merely the examples described.

The steps recited in any method or process claims may be performed by executing stored instructions with one or more processors in combination with one or more additional hardware elements such as storage devices, memory, hardware network interfaces, antennas, switches, actuators, etc., and executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present disclosure, in addition to those not specifically recited, may be varied or otherwise particularly adapted to specific environments, manufacturing specifications, design parameters or other operating requirements without departing from the general principles of the same.

The invention claimed is:

1. A vehicle system comprising:
   one or more systems sending and receiving position data and sensor data;
   an in-vehicle communication system to send and receive position data and sensor data in a Vehicle-to-Everything (V2X) system;
   an in-vehicle computing system including a processor and a storage device having non-volatile memory, the storage device for storing data and instructions executable by the processor to:
   extract driving intention data from one or more systems;
   extract driving capability data from one or more systems;
   extract driving mode data from one or more systems;
   determine autonomous driving information from the extracted driving intention, driving capability and driving mode data;
   create a message frame that includes the autonomous driving information; and
   send the message frame to the Vehicle-to-Everything (V2X) system.

2. The vehicle system as in claim 1, wherein driving intention data further comprises route data, driving behavior data and driving motion data.

3. The vehicle system as in claim 2, wherein the route data further comprises a sequence of waypoints, driving behavior data further comprises a driving task and driving motion data further comprises a vehicle trajectory.

4. The vehicle system as in claim 1, wherein driving capability data further comprises an autonomous driving level.

5. The vehicle system as in claim 1, wherein the message frame is an extension to a Basic Safety Message.

6. The vehicle system as in claim 1, wherein the message frame is sent upon request by a nearby vehicle in the V2X system.

7. The vehicle system as in claim 1, wherein the message frame is sent periodically.

8. A vehicle system comprising:
   one or more components and systems sending and receiving position data and sensor data from one or more vehicles in a vehicle-to-everything (V2X) system;
   a communication system in communication with the V2X system;
   an in-vehicle autonomous driving system in communication with the V2X system;
   an intention extraction module extracting driving intention data from the in-vehicle autonomous driving system;
   a driving capability extraction module extracting driving capability data from the in-vehicle autonomous driving system;
   a driving mode extraction module extracting driving mode data from the in-vehicle autonomous driving system; and
   a message derived from the extracted driving intention, driving capability, and driving mode data, wherein the message is sent by the communication system to the V2X system.

9. The vehicle system of claim 8, wherein driving intention data extracted from the intention extraction module further comprises route data, driving behavior data, and driving motion data.

10. The vehicle system of claim 9, wherein the route data further comprises a sequence of waypoints, driving behavior data further comprises a driving task and driving motion data further comprises a vehicle trajectory.

11. The vehicle system of claim 8 wherein the message is sent as a stand-alone message.

12. The vehicle system of claim 8 wherein the message is sent as an extension to a Basic Safety Message of the V2X system.

13. A method for communication in a vehicle-to-everything (V2X) system, the method comprising the steps of:
   extracting driving intention data from an autonomous driving system;
   extracting driving capability data from the autonomous driving system;
   extracting driving mode data from the autonomous driving system;
   deriving autonomous driving information from the extracted driving intention data, driving capability data, and driving mode data;

creating a message frame that includes the autonomous driving information; and sending the message frame by way of a V2X sender.

14. The method of claim 13, further comprising the step of including the message frame that includes the autonomous driving information as an extension to a Basic Safety Message (BSM).

15. The method of claim 13, wherein the message frame is sent upon request by a nearby vehicle in the V2X system.

16. The method of claim 13, wherein the message frame is sent periodically.

17. The method of claim 13, wherein the step of extracting driving intention data further comprises:

extracting route data;

extracting driving behavior data; and extracting driving motion data.

18. The method of claim 17, wherein the step of extracting route data further comprises extracting a sequence of waypoints, the step of extracting driving behavior data further comprises extracting a driving task and the step of extracting driving motion data further comprises extracting a vehicle trajectory.

\* \* \* \* \*